(12) United States Patent
Eccarius et al.

(10) Patent No.: US 8,236,455 B2
(45) Date of Patent: *Aug. 7, 2012

(54) METHOD FOR OPERATING A DIRECT OXIDATION FUEL CELL AND CORRESPONDING ARRANGEMENT

(75) Inventors: Steffen Eccarius, Friedrichshafen (DE); Christian Litterst, Frankfurt (DE); Peter Koltay, Freiburg (DE)

(73) Assignees: Faunhofer-Gesellschaft zur Förderung der angewandten Forschung e.V., Munich (DE); Albert-Ludwigs-Universitat Freiburg, Freiburg (DE)

( * ) Notice: Subject to any disclaimer, the term of this patent is extended or adjusted under 35 U.S.C. 154(b) by 996 days.

This patent is subject to a terminal disclaimer.

(21) Appl. No.: 12/093,838

(22) PCT Filed: Nov. 28, 2006

(86) PCT No.: PCT/EP2006/011421
§ 371 (c)(1), (2), (4) Date: Jul. 15, 2008

(87) PCT Pub. No.: WO2007/060020
PCT Pub. Date: May 31, 2007

(65) Prior Publication Data
US 2008/0318090 A1  Dec. 25, 2008

(30) Foreign Application Priority Data
Nov. 28, 2005  (DE) .......................... 10 2005 056 672

(51) Int. Cl.
*H01M 8/04* (2006.01)

(52) U.S. Cl. .......................... 429/410; 429/447; 429/513
(58) Field of Classification Search .................. 429/410, 429/443, 447, 485, 513, 515
See application file for complete search history.

(56) References Cited

U.S. PATENT DOCUMENTS

| | | | |
|---|---|---|---|
| 6,096,448 A | 8/2000 | Wilkinson | |
| 6,981,877 B2* | 1/2006 | Ren et al. | 429/513 X |
| 7,044,160 B1 | 5/2006 | Ruoff | |
| 7,140,495 B2* | 11/2006 | Hester et al. | 210/490 |
| 7,927,753 B2* | 4/2011 | Eccarius et al. | 429/443 X |
| 2005/0238932 A1* | 10/2005 | Koyama et al. | 429/13 |
| 2005/0255359 A1 | 11/2005 | Adams | |

FOREIGN PATENT DOCUMENTS

| | | |
|---|---|---|
| DE | 19947254 A1 | 4/2001 |
| DE | 19954547 A1 | 5/2001 |
| WO | 2006082087 A2 | 8/2006 |

OTHER PUBLICATIONS

International Search Report and Written Opinion for International Application PCT/EP2006/011421 (mailed Jul. 17, 2008).
German Office Action of Aug. 17, 2006.
Abstract of Litterst et al., "Increasing micro DMFC efficiency by passive CO2 bubble removal and discontinuous operation" Journal of Michromechanics and Microengineering, (2006).

* cited by examiner

*Primary Examiner* — Stephen J. Kalafut
(74) *Attorney, Agent, or Firm* — Matthew B. Dernier, Esq.; Gibson & Dernier LLP (57) ABSTRACT

The invention relates to a method for operating a direct oxidation fuel cell in which the fuel cell is supplied generally with methanol via a transport device for the fuel. The invention likewise relates to a corresponding arrangement comprising a direct oxidation fuel cell, a fuel reservoir and at least one device for transporting the fuel through the fuel cell.

22 Claims, 6 Drawing Sheets

METHOD FOR OPERATING A DIRECT OXIDATION FUEL CELL AND CORRESPONDING ARRANGEMENT

BACKGROUND

The invention relates to a method for operating a direct oxidation fuel cell in which the fuel cell is supplied generally with methanol via a transport device for the fuel. The invention likewise relates to a corresponding arrangement comprising a direct oxidation fuel cell, a fuel reservoir and at least one device for transporting the fuel through the fuel cell.

The energy requirement of electrical small consumers (PDA, mobile phones etc.) is constantly increasing. However whilst microprocessors have become approx. thirty times faster in the past ten years, the energy density of batteries has merely doubled. The fuel cell is regarded in this context as a possible replacement or as a supplement for conventional batteries and accumulators. In particular direct oxidation fuel cells (e.g. direct methanol fuel cells) are seen as particularly promising mobile energy sources since the liquid fuel can be handled comparatively easily and generally has an energy density higher by a multiple than batteries or accumulators.

One of the essential challenges for operation of a direct oxidation fuel cell resides in the production of carbon dioxide bubbles during the oxidation of the carbon-containing, liquid fuel on the anode side. There may be mentioned as example the oxidation of methanol with the help of water: $CH_3OH + H_2O \rightarrow CO_2 + 6H^* + 6e$. These bubbles can become fixed within the gas diffusion layer or in the fluid distribution structure and thus reduce the active cell surface and the performance of the fuel cell.

In a standard mode of operation, a pump which provides the direct oxidation fuel cell with liquid fuel is operated continuously. The gas bubbles are dissolved in liquid with the generally superstoichiometric volume flow or are rinsed out of the fuel cell with the liquid and are separated in a subsequent step from the liquid fuel. This requires continuous operation of the pump which is accompanied with fairly large power requirements of the pump and consequently reduces the efficiency of the system of the entire fuel cell system.

SUMMARY OF THE INVENTION

Starting from the state of the art of continuously operated systems, it was the object of the present invention to improve the operation of direct oxidation fuel cells such that a higher system efficiency of the fuel cell can be achieved. In addition, a system was intended to be provided by means of which the so-called cross-over of fuel, i.e. the penetration of unconsumed fuel through the membrane, is prevented.

This object is achieved by the generic arrangement having the characterising features of claim 1 and by the generic method having the characterising features of claim 18. A use of the arrangement according to the invention is mentioned in claim 24. The further dependent claims reveal further advantageous developments.

According to the invention, an arrangement is provided comprising at least one direct oxidation fuel cell, at least one fuel reservoir and at least one device for transporting fuel through the fuel cell. The direct oxidation fuel cell thereby contains a membrane electrode assembly (MEA) with an anode and a cathode and also at least one anode-side and cathode-side fluid distribution structure with respectively at least one current collector. Via the fluid distribution structure, both gaseous and liquid educts can thereby be guided to the membrane or gaseous or liquid products which are formed during the oxidation can be removed.

A particular feature of the arrangement according to the invention is that this has in addition a control unit for adjusting the volume flow of the fuel through the fuel cell. By using this control unit according to the invention, a discontinuous operation of the device for transporting the fuel can be made possible. With the help of this arrangement according to the invention, a significantly higher system efficiency of the fuel cell can be achieved.

This power increase has various causes which can be attributed to the fact that the fuel is not pumped continuously. On the one hand, the methanol concentration at the anode electrode is reduced by the constant consumption of the fuel, the cross-over of the fuel to the cathode is reduced and the current density increases. The second reason resides in the production of gaseous or vapour-forming aggregate states of the fuel in the $CO_2$ bubbles which form and occur only to a small extent during continuous operation. The gaseous fuel, in comparison with the liquid aggregate state, has better kinetics of the oxidation reaction, i.e. higher efficiency. Since the electrode in this case is not necessarily in contact with a liquid, the cross-over can in addition be reduced further. An increase in temperature also provides a further contribution since "cooling" due to a permanent flow does not take place. This leads likewise to improved kinetics of the oxidation reaction.

The control unit in the arrangement according to the invention is preferably a pressure container with switchable valve, preferably a bistable valve.

Pumps are suitable in particular as devices for transporting the fuel. In particular pumps through which liquid can flow in the non-operating state are hereby preferred so that, in the non-operating state, even with further consumption of fuel, depletion of fuel in the fuel cell is prevented. An example of such a pump is a pump which has diffuser elements instead of non-return valves (so-called nozzle diffuser pump).

The membrane electrode assembly has the construction known from the state of the art. Thus the latter comprises a proton-conducting membrane e.g. made of Nafion, and also respectively anode-side and cathode-side catalyst- and diffusion layers. The proton-conducting membrane should thereby be impermeable for the fuel and the reaction products.

With respect to the catalyst layers, those materials must be preferred which have a large active surface, resistance to carbon monoxide and as far as possible no secondary reactions or secondary products. Particularly preferably, catalyst layers thereby contain platinum, ruthenium and/or alloys thereof.

The diffusion layers are intended to enable transport of the fuel to the anodic catalyst layer and of the further educt to the cathodic catalyst layer. In addition, the diffusion layer must enable transport of the gaseous reaction products from the anodic catalyst layer or of the reaction products from the cathodic catalyst layer. A further requirement of the diffusion layer concerns the property thereof for electron conduction.

Also microstructures can be used instead of diffusion layers.

A further preferred variant of the arrangement according to the invention provides that the fuel cell has in addition a device for degassing the liquid fuel. A variant for this provides microstructuring of the fluid distribution structure by means of which the removal of gaseous media from the fluid distribution structure is assisted. Reference is made with respect to this variant to FIGS. 1 to 4.

Another variant for the degassing provides that the fuel cell has, on the anode-side, at least one barrier layer which is impermeable for gases and for liquids. As a result, the liquids can be retained in the fluid distribution structure and the gases transported away from the fluid distribution structure. Reference is made with respect to this variant to FIG. 5. The barrier layer is thereby preferably an oleophobic membrane. However also microstructures or ceramics can likewise be used as barrier layer. With respect to the arrangement of the barrier layer, a first preferred variant provides that this is disposed between the anode-side end-plate which is located on the side of the fluid distribution structure which is orientated away from the MEA and the anode-side fluid distribution structure. Another preferred variant provides that the barrier layer is disposed on the side of the anode-side end-plate which is orientated away from the anode-side fluid distribution structure. Preferably the end-plate contains degassing holes.

According to the invention, a method is likewise provided for operating a direct oxidation fuel cell, in which the fuel cell is supplied with the fuel via a transport device. It is a particular feature of the method according to the invention that the volume flow of the fuel through the fuel cell is controlled, as a result of which a discontinuous volume flow is made possible. This discontinuous volume flow confers the previously described advantages.

A preferred variant provides that the volume flow is effected at intervals. This means that the transport of the fuel through the fuel cell is effected in a first phase A, whilst the transport is interrupted in a further phase B, phases A and B alternating. With respect to the interval lengths, there are no compulsory prerequisites since the interval lengths are set as a function of the geometry of the fluid distribution structures, the operating point of the fuel cell and the dilution of the fuel.

The method according to the invention is preferably implemented with the above-described arrangement according to the invention. However it is also possible to implement the method with devices with any arrangement of the individual components.

BRIEF DESCRIPTION OF THE DRAWINGS

The subject according to the invention is intended to be explained in more detail with reference to the subsequent Figures, without wishing to restrict the latter to the special embodiments shown here. There are shown.

DETAILED DESCRIPTION OF THE INVENTION

Figure 1:
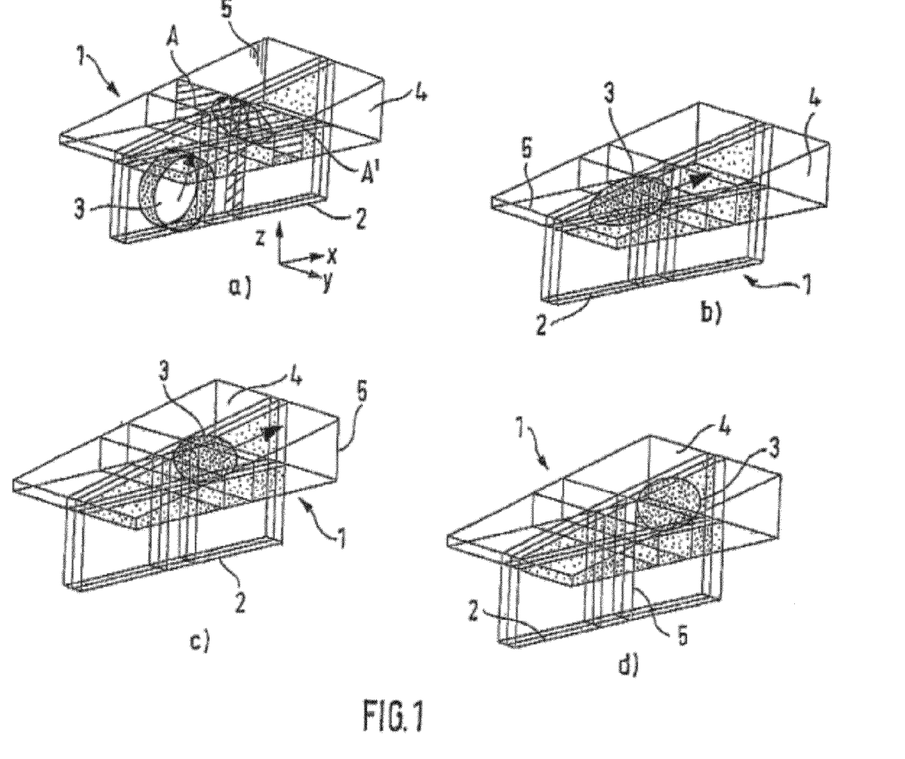
FIG. 1 a perspective view of a channel portion from a device for removing gaseous components in the form of a microstructure with an inclusion at four successive times, FIG. 2 a cross-section through a channel in a different embodiment of the microstructure with inclusions at six successive times and also a side view of the same channel with an inclusion at two successive times, FIG. 3 respectively a longitudinal section through a channel from two other embodiments of the microstructure and FIG. 4 again respectively a longitudinal section through two channels of further embodiments, FIG. 5 schematically, the construction of an arrangement according to the invention, FIG. 6 with reference to a diagram, the voltage course as a function of the time with a discontinuous volume flow, FIG. 7 with reference to a diagram, comparison of the current densities with a continuous volume flow, discontinuous volume flow and discontinuous volume flow assisted by hydrostatic pressure in the reservoir with a microstructure.

In FIG. 1, the same channel 1 is illustrated four times, said channel being integrated in a chemical microreactor, which is itself not illustrated, and being disposed therewith a side face 2 which is respectively situated at the bottom in the Figure, abutting on a catalytic membrane. The channel 1 conducts a flowable medium which, in the present case, concerns a liquid. An operation of the chemical microreactor according to requirements is associated with formation of gas at the catalytic membrane, which gas enters into the channel 1 at the side face 2 and forms bubbles there. An inclusion 3 formed by such a bubble is represented in FIG. 1 in the illustrations characterised with a), b), c) and d) at four successive times, illustration b) reproducing a time 0.000755 s after that shown in illustration a), illustration c) one 0.001175 s after and illustration d) one 0.00301 s after.

In the case of other similarly embodied devices, the inclusions 3 can also be formed by a fluid which can be differentiated from the medium guided through the channel 1. It would also be possible that each flowable medium could be present not as a liquid but as a gas. In the case described here, the flowable medium concerns a liquid reactant which is supplied to the channel 1 from an end which is situated respectively on the left in FIG. 1. At one end of the channel 1 illustrated situated respectively on the right in FIG. 1, said channel has an open-ended channel outlet 4 through which the gas forming the inclusion 3 can escape into the environment of the microreactor.

The channel 1 has a cross-section which forms a T-profile, the side face 2 terminating a further bar which protrudes from a transverse bar of the T-profile. As a result of capillary forces which effect minimisation of the surface energy of the inclusion 3, the inclusion 3 formed at the side face 2 initially increases up to a point at which the mentioned further bar touches the transverse bar, as a result of which the inclusion 3 is removed from the catalytic membrane abutting on the side face 2.

In addition, the channel 1 now has a geometry which forces the inclusion 3 into a form in which again capillary forces act on it, said capillary forces moving the inclusion 3 along the channel 1 towards the channel outlet 4. This geometry is characterised in that a ratio $A'/l'$ and a ratio $A/l$ increase strictly monotonically and constantly along the channel 1 towards the channel outlet 4, wherein the value A may be defined as surface content and the value l as circumferential length of this cross-section for each cross-section of the channel 1 which is perpendicular to a longitudinal direction of the channel 1, whilst there may be termed with $A'$ a surface content and, with $l'$, a length of a circumferential line of an associated surface situated within this cross-section, this surface being defined in that $A'/l'$, compared with all other associated surfaces situated in the cross-section, assumes a maximum value, θ being defined as wetting angle which is set at the level of the respective cross-section at the channel wall 5 between the flowable medium conducted by the channel 1 and the gas forming the inclusions 3 (or liquid fluid in the case of other embodiments of the invention) and is situated completely in the first-mentioned flowable medium. In the present example, $θ<π/2$ applies so that in particular sine(cos θ)=+1 applies and hence also the values sine(cos θ) $A'/l'$ and sine(cos θ) $A/l$ increase strictly monotonically and constantly along the channel 1 towards the open-ended channel outlet 4.

The monotonic increase in the mentioned values or ratios along the channel 1 towards the channel outlet 4 is achieved in the present case in that the surface content A of the cross-section of the channel 1 and hence also the surface content $A'$ of the mentioned surface which is situated within the cross-section and corresponds as a good approximation to the surface which endeavours to assume an inclusion 3 within the cross-section, increases monotonically along the channel. An increase in those surfaces A and A' along the channel 1 is thereby achieved in that a dimension of the cross-section is formed monotonically increasing in a direction along the channel 1 which is perpendicular to the transverse bar of the mentioned T-profile, which is achieved by an extension, which increases in the course of the channel 1, of a part of the T-profile which forms the transverse bar in the direction perpendicular to the transverse bar and a profile change associated therewith. The part of the channel 1 which forms respectively the transverse bar of the T-profile consequently maintains a wedge shape. Also other geometries of the channel 1 would be conceivable in which a greatest diameter of the cross-section of the channel 1 and/or a dimension of this cross-section increases monotonically in a direction along the channel 1 which is perpendicular to that diameter in order consequently to induce a movement of inclusions 3 in a preferential direction by means of capillary forces. In the present case of the channel 1 from FIG. 1, a profile change is produced in the described manner in which also a ratio defined as $A/l^2$ and one defined as $A'/l'^2$ increases constantly and strictly monotonically along the channel 1 towards the channel outlet 4.

Finally it would also be possible to configure the channel wall 5 of the channel 1 alternatively or additionally to a profile change with surface properties which change along the channel, for example by a location-dependent coating so that the wetting angle θ, which is a function of the gas forming the inclusions 3, of the flowable medium conducted by the channel 1 and of the surface properties of the channel wall 5, has a value which changes along the channel 1 and in that the inclusions 3 are consequently brought into a form which causes or increases the capillary forces which move the inclusions 3 towards the channel outlet 4.

The channel which is not illustrated to scale in FIG. 1 is furthermore dimensioned such that the surface content A of the cross-section of the channel 1 has a value of 25000 μm² at one channel start and increases over a stretch of a length of 0.7 mm along the channel 1 uniformly up to a value of 95000 μm² at the channel outlet 4. The channel 1 thereby has a constant width of 500 μm in the present case which is provided by a length of the transverse bar of the mentioned T-profile. A corresponding configuration of one capillary in which a cross-sectional change is achieved merely by tilting at least one of the channel walls 5 by only approx. 0.001° would also be possible.

During operation of the microreactor which contains the illustrated channel 1, the inclusions 3, one of which is illustrated in FIG. 1, are produced at the side face 2, the gas forming the inclusions 3 having a chemical composition which is established unequivocally on the basis of the reaction which takes place, device-related, on the side face 2 or on the catalytic membrane abutting there. Hence also the wetting angle θ which was used previously to describe properties of the channel 1 is also established. Because of the described geometry of the channel 1, the inclusions 3 are now moved towards the channel outlet 4 driven exclusively by capillary forces.

Apart from in chemical microreactors, capillaries conducting flowable media of the type of the above-described channel 1 can also be provided in other devices, in particular for the purpose of degassing or removing other inclusions, for example in devices which contain refillable liquids and in which refilling is associated typically with bubble formation. Refillable ink cartridges may be mentioned as an example.

Figure 2:
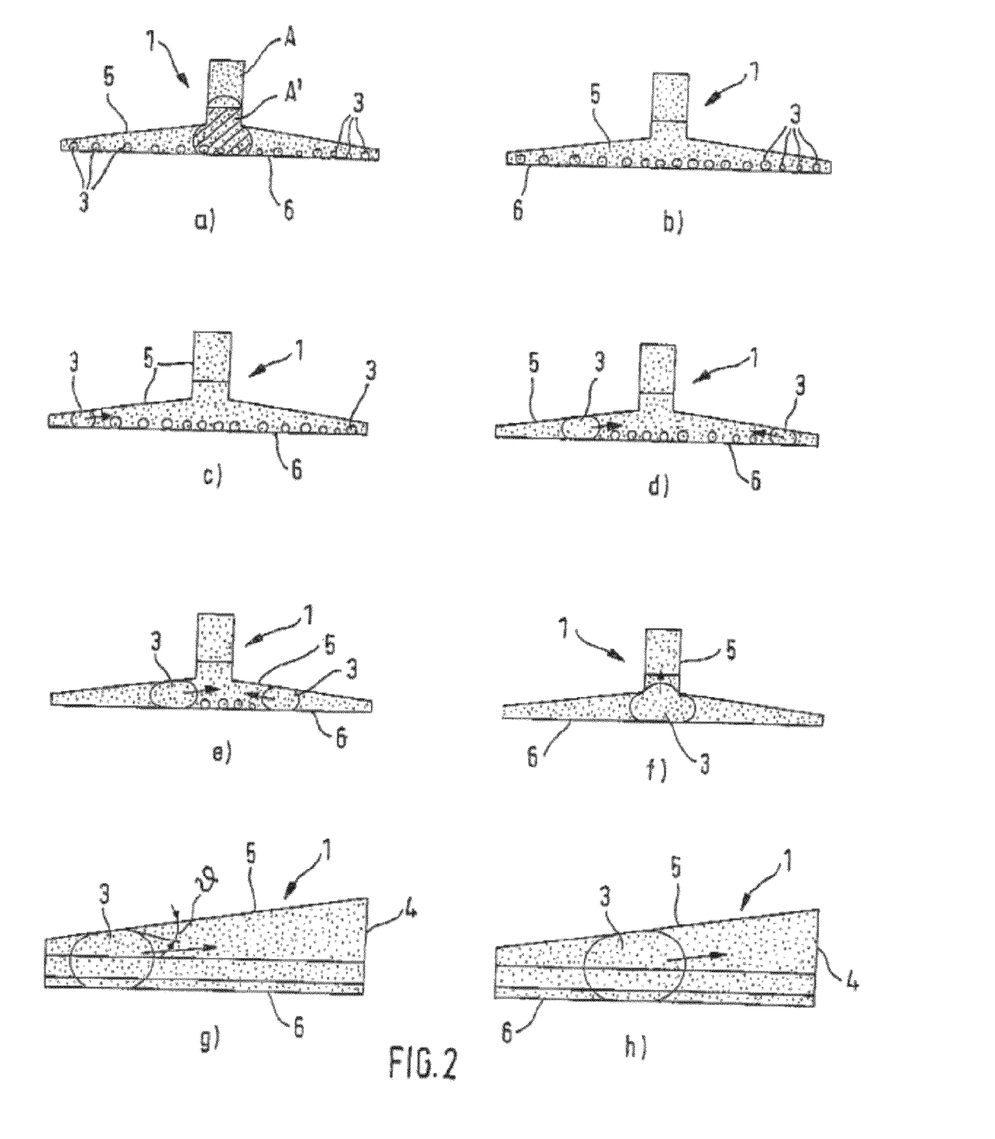

A similar channel 1, which serves for transporting a liquid reactand in a bipolar plate of a fuel cell stack and has similar dimensions to the previously described channel 1, is represented in FIG. 2 as cross-section (illustrations a) to f)) and as side view (illustrations g) and g)). The fuel cell stack which is itself not illustrated comprises in the present case direct methanol fuel cells, the illustrated channel 1 serving primarily for transporting methanol which forms the mentioned reactand.

The channel 1 again has a cross-section forming a T-profile, a transverse bar of this T-profile which is situated respectively at the bottom in FIG. 2 abuts on a diffusion layer which serves as catalyst and, for its part, abuts on an electrolyte membrane. The diffusion layer forms an active surface 6 on which gaseous carbon dioxide is formed during operation of the fuel cell stack, said carbon dioxide forming inclusions 3 which are surrounded by the methanol within the channel 1. The transverse bar of the T-profile has a form which tapers towards two ends, a further bar which points away from the active surface 6 protruding centrally on the transverse bar. The illustrations in FIG. 2, characterised by a) to f), show that this form of the T-profile has the result that the growing inclusions 3 move towards the mentioned further bar because of capillary forces, larger inclusions 3 absorbing within themselves smaller inclusions 3 encountered on the way. It can be provided in other embodiments of the invention that the mentioned further bar, which starts centrally on the transverse bar of the T-profile, widens out from the transverse bar, as a result of which movement of the inclusions 3 can be induced into the further bar of the T-profile because of capillary forces and hence away from the active surface 6. In a similar manner, the channel 1 could be configured in a modification of the invention also with an L-profile (which would result by omitting half of the transverse bar) with a leg abutting on the active surface 6.

In the case of the previously described example, the channel 1 illustrated in FIG. 2 also has a cross-section A which increases constantly and strictly monotonically along the channel 1 towards a channel outlet 4, a ratio, defined as A/l, also increasing constantly and strictly monotonically towards the channel outlet 4, l being defined as circumferential length of the cross-section of the channel 1. The inclusions 3 form, with a channel wall 5, a wetting angle or contact angle θ with a small value of between 0 and π/2, for which reason the mentioned increase in the ratio A/l and the thus associated increase in the ratio A'/l' (A' and l' may be defined as explained previously in the context of FIG. 1) has the result that these capillary forces which are moving towards the channel outlet 4 act on the inclusions 3. The increase in cross-section A and in a movement, induced as described, of an inclusion 3 towards the channel outlet 4 is illustrated in illustrations g) and h) which reproduce two successive times. The wetting angle θ is illustrated there also at one point.

Similarly to the channel 1 described here, a coolant channel can also be configured, which conducts a liquid coolant and in which vapour bubbles of the coolant can form during operation of the fuel cell stack or of another chemical microreactor. Corresponding channels 1 can be disposed also not only in bipolar plates but also in other current consumers, for example of fuel cells.

Figure 3:
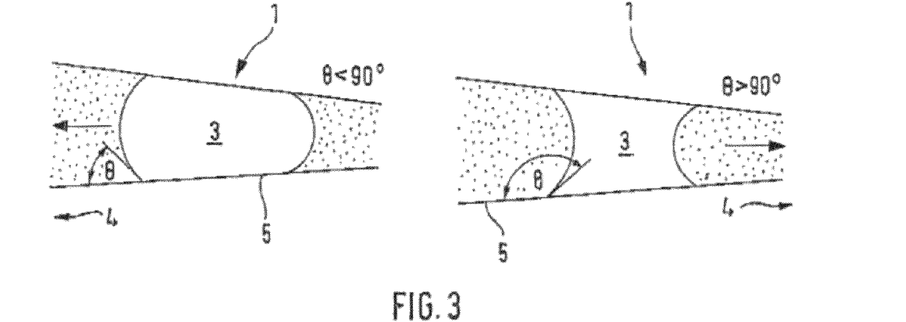
Figure 4:
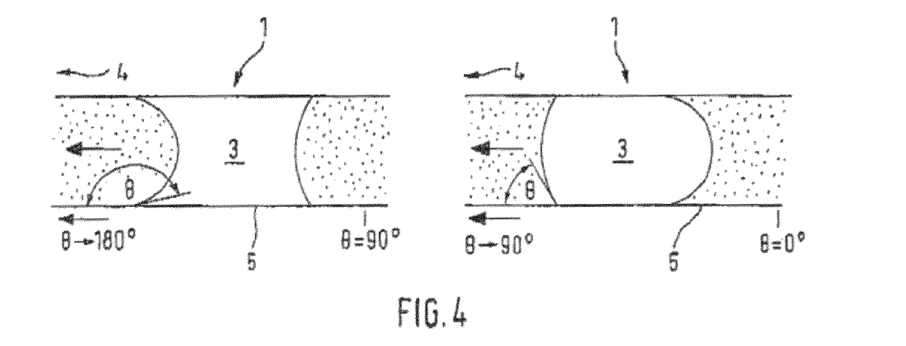

FIGS. 3 and 4, in which recurring features are characterised again with the same reference numbers, illustrate once again the described effects of a bubble transport which can be attributed to capillary forces. In FIG. 3 on the left, a channel 1 with an inclusion 3 of a fluid is shown, which is enclosed on the right and left by a flowable medium. The contact angle θ, which is defined as situated completely in the flowable medium out with the inclusion 3, is here smaller than π/2 so that an increase of A/l (and A'/l') towards the channel outlet 4 (here to the left) effects a bubble transport in this direction. In the same FIG. 3, another channel 1 from another device is illustrated on the right, in which inclusions 3 are formed in a similar manner and in the case of which however a contact angle θ is set which is greater than π/2. A reduction in A/l (and A'/l' towards the channel outlet 4 (now situated on the right) is effected such that the inclusions 3 are moved to there.

FIG. 4 illustrates in two examples, on the left for θ>π/2 and on the right for θ<π/2, how a corresponding effect is achieved even with constant channel cross-section by means of location-dependent values of θ. In both cases, an increase of θ towards the channel outlet 4 (respectively situated on the left) effects a force which acts on the respective inclusion 3 and moves the latter towards the channel outlet 4. In all the portrayed cases, the movement is effected by different capillary pressures at the two oppositely situated ends of the respective inclusion 3, which is reflected in different curvatures of the menisci delimiting the inclusions. This effect is caused, in the examples of FIG. 3, by the channel geometry, in the examples of FIG. 4, by a location-dependent contact angle θ which can be achieved a surface coating of the channel wall 5 which changes along the channel 1. Of course, the effects described with reference to FIGS. 3 and 4 can also be superimposed (by combination of the features).

With the present microstructure, it is proposed in particular accordingly to use geometric structures for the transport of gas bubbles, in that the geometry of fluid-conducting channels 1 is configured correspondingly to the respective requirements. If for example a side wall 2 of the channel 1 is formed by a membrane on which a reaction takes place and produces for example gas which is intended to be removed as rapidly as possible, then the channel geometry can be configured such that the gas is transported away from the membrane solely because of capillary forces. Structures of the type presented here can therefore be used for passive removal of gas volumes, the channels 1 being able to prescribe a preferential direction and being able to be used for passive transport also over fairly long stretches. With respect to discharge of the gas bubbles, no externally acting forces and hence also no corresponding external components, such as for example pumps, are thereby required. FIGS. 1 and 2 are based on numerical flow simulations and show how gas volumes which form the inclusions 3 move respectively into a specific section of a cross-section because of minimisation of surface energies and are forced there into a movement along the channel 1 because of different capillary pressures. This movement typically lasts until detachment of the corresponding gas volume from the channel walls 5 at a channel outlet 4 since then an energy minimum is reached.

It is therefore proposed in particular to use passive systems of the type described here for transport of a phase forming inclusions 3 (typically gas) in chemical reactor systems. Typical reactors which are suitable for use of such structures are catalytic reactors, such as for example fuel cells with catalytic membranes at which gas bubbles are produced continuously. By means of a speedy removal of the gas bubbles, blocking of an active membrane surface is hence prevented, in that this membrane surface is swept clean. The resulting gas bubbles independently ensure, with the help of the special adapted geometry of the channels 1 a typically periodic cleaning of the membrane surface of gas bubbles. This method ensures a maximum free reaction surface, ensures automatic refilling of the reactor with the corresponding reactands and hence offers great advantages relative to the state of the art.

The geometric structures, by means of which the desired capillary forces for passive transport of the phase forming bubbles are caused, can also comprise webs and narrowings or be produced by such. The geometry is thereby intended to be produced such that the phase forming bubbles is moved in a preferential direction because of the geometry and because of surface qualities of the geometric structures—driven by a surface tension of the resulting bubbles—, wherein transport of the bubbles being effected typically exclusively passively, i.e. driven merely by the capillary forces at phase boundaries.

Figure 5:
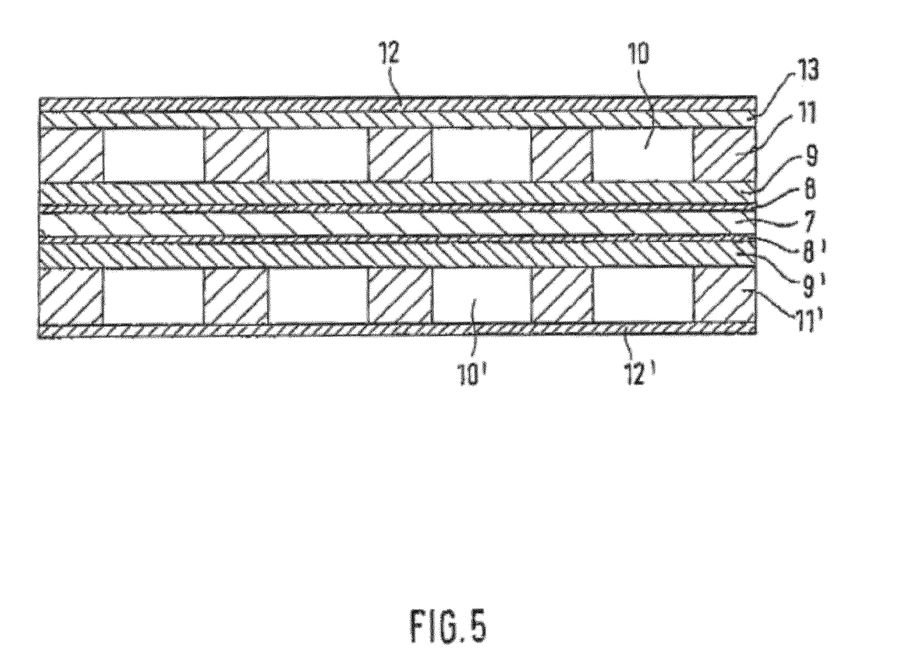

In FIG. 5 the construction of a variant according to the invention of the claimed arrangement is represented. This is based on a membrane electrode assembly (MEA) with a proton-conducting membrane 7 on which anode-side and cathode-side catalyst layers 8 and 8' and also gas diffusion layers 9 and 9' abut. On the anode-side, a fluid distribution structure 10 with associated current collectors 11 is subsequently disposed. In a similar manner, the cathode-side has a fluid distribution structure 10' with current collectors 11'. End-plates 12 and 12' respectively form the termination on both sides, in addition a gas-permeable but liquid-impermeable barrier layer being disposed on the anode side, e.g. an oleophobic membrane. With the help of this barrier layer 13, the fuel is retained in the fluid distribution structure, whilst the carbon dioxide produced in the case of oxidation of methanol can escape into the environment. The arrangement of the barrier layer is not compulsory since this can be applied externally also on the end-plate 12.

Figure 6:
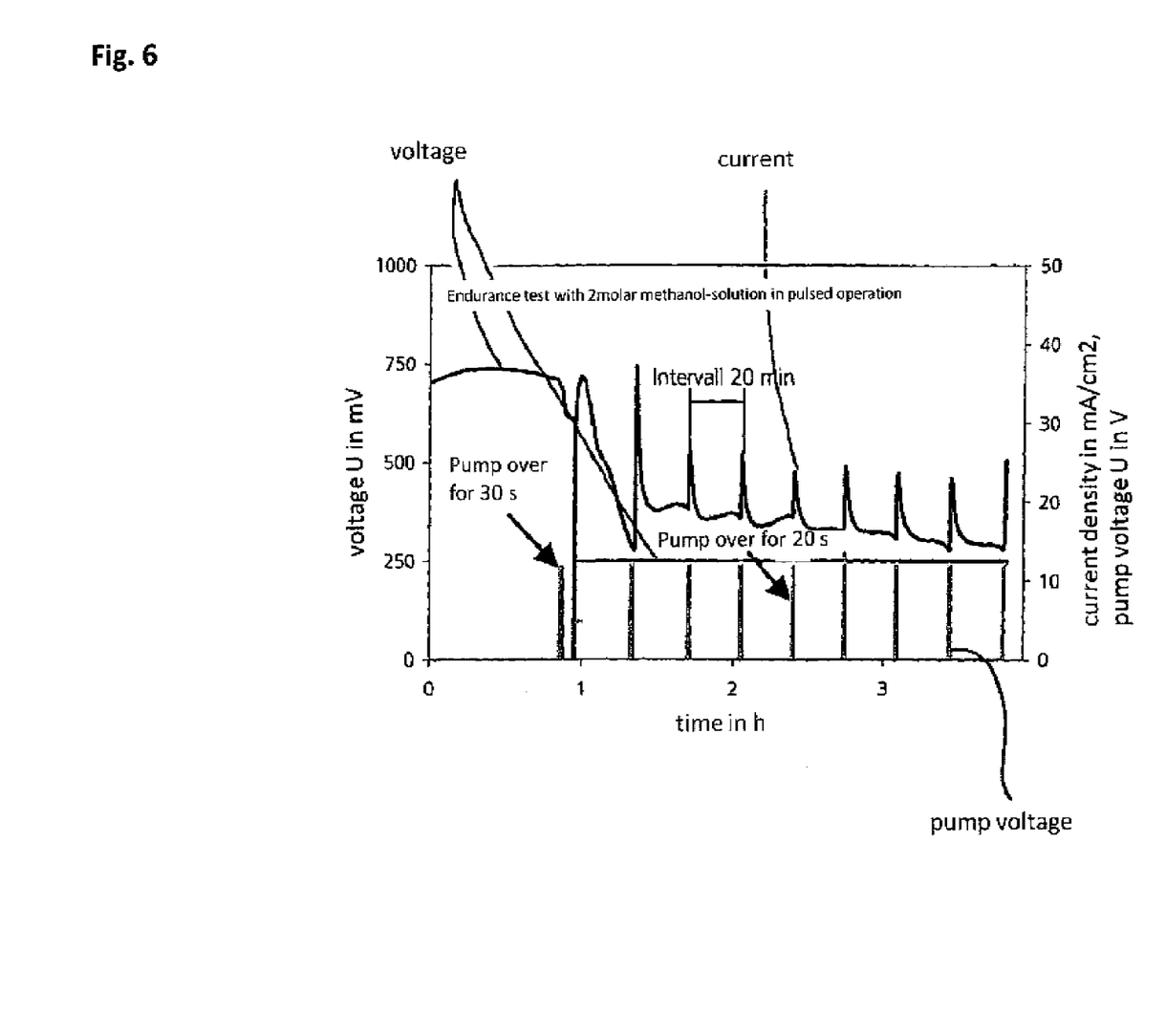

With reference to FIG. 6, the voltage course during pulsed transport of the fuel is represented. In the present case, pumping for 20 seconds suffices to operate the fuel cell for 20 min.

Figure 7:
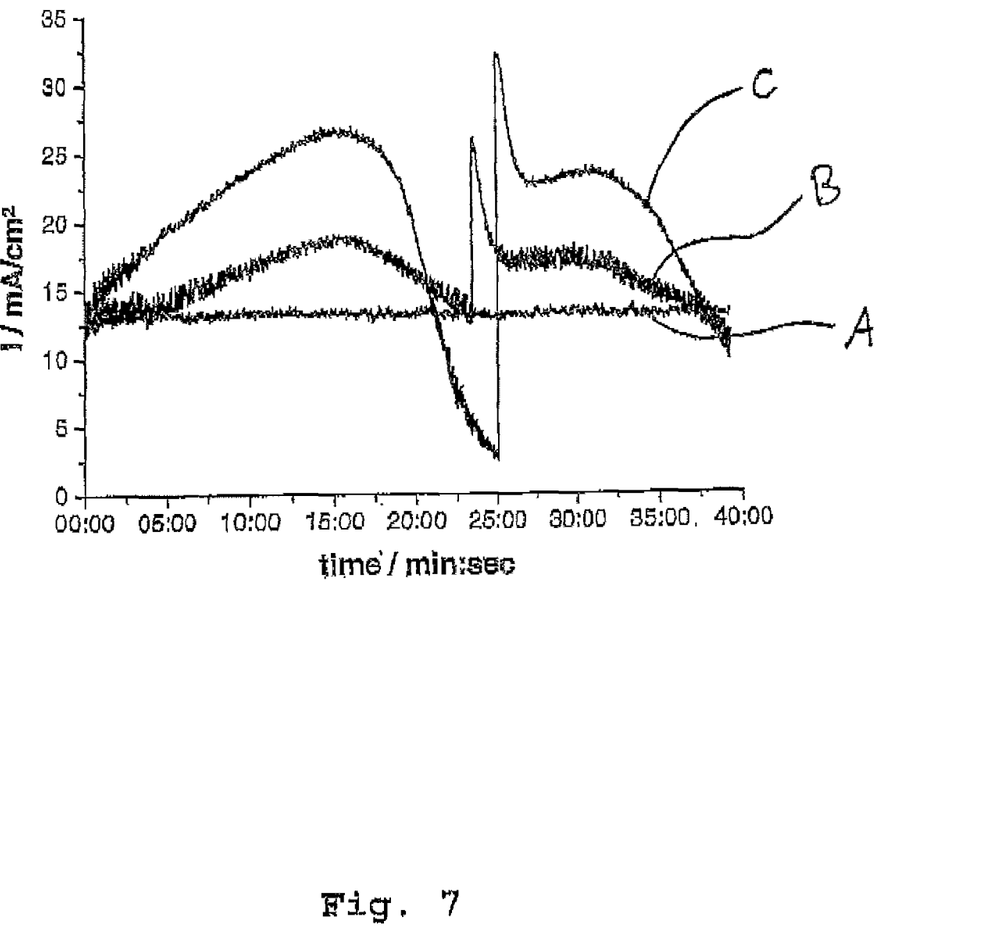

In FIG. 7, three different modes of operation are compared with each other, continuous pumping (A) known from the state of the art, discontinuous pumping (B) with a closed valve between reservoir and fuel cell and discontinuous pumping (C) assisted by hydrostatic pressure in the reservoir. In all three variants, degassing was effected with the previously described microstructuring as represented also in FIGS. 1 to 4. High flow rates of the fuel can have a negative effect on the performance of the fuel cell because of the higher pressure and constant high fuel concentration since the so-called cross-over of fuel is assisted as a result. Conversely, low flow rates assist the overall efficiency of the fuel cell system. As can be detected in FIG. 7, the current and hence also the performance of a fuel cell can be increased by continuous pumping (B in FIG. 7). In this case, the pump is stopped and switched on for a short time after approx. 23 minutes. A further increase can be achieved in that a pump which allows a flow of liquid in the non-operating state is used (C in FIG. 7).

The invention claimed is:

1. An apparatus, comprising:
   at least one direct oxidation fuel cell including a membrane electrode assembly with anode and cathode and also at least one anode-side and cathode-side fluid distribution structure with respectively at least one current collector and also at least one fuel reservoir,
   at least one device for transporting fuel through the fuel cell,
   a control unit operating to adjust the volume flow of the fuel through the fuel cell such that a discontinuous operation of the device for transporting the fuel is achieved, and
   a degassing device operating to remove gaseous components of a liquid fuel, wherein the degassing device includes microstructuring of at least one fluid distribution structure which assists the removal of gaseous media from the fluid distribution structure.

2. The apparatus according to claim 1, wherein the control unit is a pressure container with switchable, bistable valve.

3. The apparatus according to claim 1, wherein the device for transporting the fuel in a non-operating state allows transport of the fuel from the reservoir to the fuel cell.

4. The apparatus according to claim 1, wherein the device for transporting the fuel is a micropump.

5. The apparatus according to claim 4, wherein the micropump is a pump with diffuser elements.

6. The apparatus according to claim 1, wherein the membrane electrode assembly comprises a proton-conducting membrane and also respectively anode-side and cathode-side catalyst layers and diffusion layers.

7. The apparatus according to claim 1, wherein the membrane electrode assembly comprises a proton-conducting membrane and also respectively anode-side and cathode-side catalyst layers and microstructures.

8. The apparatus according to claim 1, wherein the proton-conducting membrane is impermeable for the fuel and reaction products.

9. The apparatus according to claim 7, wherein the catalyst layers contain platinum, ruthenium and/or alloys thereof.

10. The apparatus according to claim 1, wherein the fluid distribution structure has at least one channel with a T-shaped cross-section.

11. The apparatus according to claim 1, wherein the fuel cell has on the anode-side at least one barrier layer which is permeable for gases and impermeable for liquids, as a result of which the liquids are retained in the fluid distribution structure and the gases are transported away from the fluid distribution structure.

12. The apparatus according to claim 11, wherein the at least one barrier layer comprises an oleophobic membrane.

13. The apparatus according to claim 11, wherein an anode-side and a cathode-side end-plate are disposed on the side of the fluid distribution structures which is orientated away from the membrane electrode assembly.

14. The apparatus according to claim 13, wherein the at least one barrier layer is disposed between the anode-side end-plate and the anode-side fluid distribution structure.

15. The apparatus according to claim 14, wherein the at least one barrier layer is disposed on the side of the anode-side end-plate which is orientated away from the anode-side fluid distribution structure.

16. A method for operating a direct oxidation fuel cell, in which the fuel cell is supplied with fuel via a transport device, comprising:
controlling a volume flow of the fuel in the fuel cell so that the volume flow is discontinuous; and
removing gaseous components of the fuel, wherein microstructuring of at least one fluid distribution structure assists the removal of gaseous media from the fluid distribution structure.

17. The method according to claim 16, wherein the volume flow is effected in the fuel cell at intervals.

18. The method according to claim 17, wherein interval lengths are set as a function of a geometry of a fluid distribution structure, an operating point of the fuel cell and a dilution of the fuel.

19. The method according to claim 16, wherein the transport device is switched on when current or voltage falls below a defined threshold value.

20. The method according to claim 16, wherein a pump is used as a transport device.

21. The method according to claim 16, wherein:
the oxidation fuel cell includes a membrane electrode assembly with anode and cathode and wherein the at least one fluid distribution structure comprises at least one anode-side and cathode-side fluid distribution structure with respectively at least one current collector and also at least one fuel reservoir; and
a control unit is operable to adjust the volume flow of the fuel through the fuel cell, as a result of which a discontinuous operation of the device for transporting the fuel is made possible.

22. A method of operating a direct oxidation fuel cell, the oxidation fuel cell including a membrane electrode assembly with anode and cathode and also at least one anode-side and cathode-side fluid distribution structure with respectively at least one current collector and also at least one fuel reservoir, comprising:
transporting fuel through the fuel cell using a transport device;
controlling a volume flow of the fuel through the fuel cell, as a result of which a discontinuous operation of the device for transporting the fuel is made possible; and
removing gaseous components of the fuel, wherein microstructuring of at least one fluid distribution structure assists the removal of gaseous media from the fluid distribution structure.

* * * * *